United States Patent Office 3,423,485
Patented Jan. 21, 1969

3,423,485
PHOSPHORUS-CONTAINING SULFONYL-HYDRAZIDES
John E. Herweh and Algirdas C. Poshkus, Lancaster, Pa., assignors to Armstrong Cork Company, Lancaster, Pa., a corporation of Pennsylvania
No Drawing. Filed Apr. 6, 1966, Ser. No. 540,486
U.S. Cl. 260—923   3 Claims
Int. Cl. C07c 9/40

This invention relates broadly to a new class of blowing agents for resinous blends and more particularly relates to a new class of chlorosulfonated phosphorus-containing compounds useful as organic intermediates and to a new class of compounds particularly useful as blowing agents formed by reaction of the organic intermediates with hydrazine. The phosphorus-containing blowing agents of this invention have the capability of imparting fire retardency to the extent they are incorporated in resinous foams.

The compounds of this invention are formed by initially chlorosulfonating pentavalent phosphorus esters to form compounds of the formula:

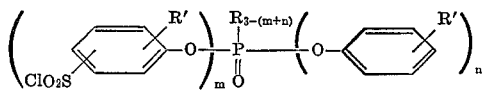

These compounds are then reacted with hydrazine to form sulfonylhydrazides of the following formula:

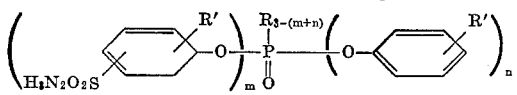

In these formulas, R may be lower alkyl such as methyl and ethyl; R' may be halogen, $NO_2$, lower alkyl, and H; $m$ is an integer from 1 to 3; $n$ is an integer from 0 to 2; and the sum of $m+n$ is not greater than 3, i.e. $m+n$ is an integer from 1 to 3.

Representative of pentavalent phosphorus esters useful in the practice of this invention are the phosphates, phosphonates and phosphinates of the following formula:

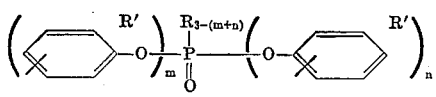

Examples of phosphates useful in the practice of this invention are triphenyl phosphate, tri-o-, m- or p-tolyl phosphate and tri-o-, m- or p-chlorophenyl phosphate. Examples of phosphonates are diphenyl methylphosphonate, diphenyl ethylphosphonate, di-o-, m- or p-tolyl methylphosphonate and the ethyl analogs thereof, and di-o-, m- or p-chlorophenyl methylphosphonate and the ethyl analogs thereof. Examples of phosphinates are o-, m- or p-tolyl dimethylphosphinate, phenyl dimethylphosphinate, o-, m- or p-chlorophenyl dimethylphosphinate, and the ethyl analogs such as o-tolyl diethylphosphinate.

The chlorosulfonated intermediates are readily formed by adding the pentavalent phosphorus ester to excess chlorosulfonic acid, at least two times the amount of chlorosulfonic acid required for addition of each sulfonyl chloride group to the phenyl ring in accordance with the following equations:

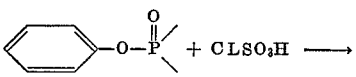

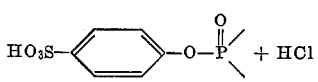

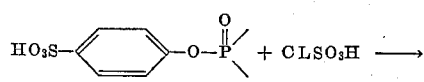

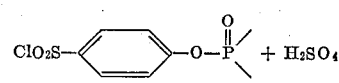

No solvent is needed for carrying out the reaction and preferably the addition is carried out at a temperature of from about 20°–25° C. with cooling if necessary. Upon completing the addition, the reaction mixture is heated at moderate temperatures, i.e. 50° C. or less, for at least 6 hours or until HCl evolution ceases.

The chlorosulfonated derivatives are then reacted with hydrazine by adding hydrazine to a solution of the chlorosulfonated phosphorus ester in a polar solvent such as tetrahydrofuran or acetonitrile. The addition is made with stirring at low temperature (0° to 10° C.) and, upon completion of the addition, the stirred solution is allowed to warm to room temperature. Usually a 5% to 10% molar excess of hydrazine is employed, 2 moles of hydrazine per mole of sulfonyl chloride being required to complete the reaction:

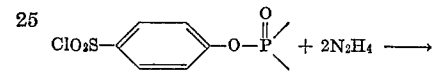

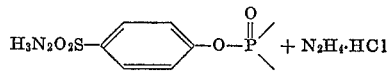

The addition of hydrazine to the sulfonyl chloride as well as the low reaction temperature are employed to minimize the competing reaction:

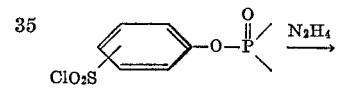

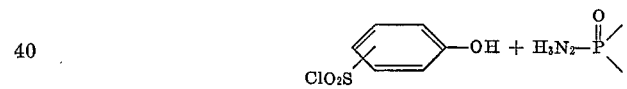

Example 1.—Preparation of tris(p-chlorosulfonylphenyl) phosphate

Triphenyl phosphate (195.8 grams, 0.6 mole) was added in 20 minutes from a solids addition tube to stirred, freshly distilled chloro-sulfonic acid (2,093 grams, 18 moles) under a slight positive nitrogen pressure. Reaction temperatures were maintained at 22° to 24° C. by means of an ice and water bath during the addition of phosphate. The phosphate dissolved almost immediately and hydrogen chloride was evolved. Upon completing the addition, the pale, clear, yellow reaction mixture was heated to 49° to 51° C. and maintained at this temperature range for 6 hours. The resultant clear, pale amber reaction mixture was carefully added dropwise to a suitable quantity of crushed ice (enough to maintain temperature of about 0°–5° C.). A white solid precipitate was filtered and pressed dry; the clear, slightly yellow filtrate was discarded. Twenty-nine hundred (2,900) milliliters of chloroform was added to the powdered filtercake and a relatively small water layer containing a white semi-solid was separated from the lower, colorless, organic phase. After washing with three 25-ml. portions of chloroform, the aqueous layer which still contained a white gelatinous solid was discarded. The combined chloroform solutions was washed consecutively with two 50-ml. portions of aqueous 10% sodium bicarbonate and three 100-ml. portions of saturated sodium chloride and dried over anhydrous magnesium sulphate. Concentration at reduced pressure (pot temperature of 40°–50° C.) of the dried chloroform layer to approximately 500 ml. gave a white solid slurry. The slurry was diluted with 500 ml. of hexane, cooled to 0° and filtered. The washed and dried filter-cake (304.4 grams) softened at 103° C. and melted at 110°–118° C. Recrystallization of the reaction product from 3,000 ml. of a 3:1 carbon tetrachloride-benzene solution gave 265.3 grams of the chlorosulfonated triphenyl phosphate melting at 115°–119° C.

The recrystallized product was very soluble in chloroform, benzene, acetonitrile, dioxane, methyl ethyl ketone, methylene chloride and diglyme. Hexane and petroleum ether failed to dissolve the product, whereas some degree of solubility was achieved in hot cyclohexane and carbon tetrachloride.

*Analysis.*—Calcd. for $C_{18}H_{12}Cl_3O_{10}PS_3$: C, 34.77; H, 1.95; Cl, 17.11; P, 4.97; S, 15.47; mol. wt. 621.8. Found: C, 34.96; H, 1.96; Cl, 17.19; P, 4.99; S, 15.70; mol. wt. 593.3 as determined in THF by vapor pressure osmometry.

Example 2.—Preparation of tris(p-hydrazidosulfonylphenyl) phosphate

Hydrazine (85%, 2.48 grams, 0.066 mole) was added dropwise in 10 minutes to a stirred solution of the chlorosulfonated triphenyl phosphate of Example 1 (6.21 grams, 0.01 mole) in 100 ml. of tetrahydrofuran at 4° C. Reaction temperatures were maintained at 5°–10° C. during the addition of hydrazine. After completing the addition, the reaction mixture was stirred and left to warm to room temperature over a period of 45 minutes. Tetrahydrofuran insolubles filtered and dried gave a slightly gummy white solid (2.5 grams). The tetrahydrofuran filtrate was washed with saturated sodium chloride, dried over magnesium sulphate, and then diluted with 250 ml. of cold petroleum ether. A white solid precipitated which, when filtered and dried, gave 4.6 grams of material melting at 144°–147° C. (meq. of bromine required per gram=18.7). Concentration of the tetrahydrofuran-petroleum ether filtrate left 0.7 gram of a solid, identified by melting point and mixture melting point as p-hydroxy benzenesulfonylhydrazide.

The slightly gummy white solid obtained from the tetrahydrofuran insolubles was largely soluble in water. Its aqueous solution was combined with the saturated sodium chloride washings from the tetrahydrofuran layer. Treatment of the aqueous solution with excess concentrated sulfuric acid precipitated 3.3 grams of hydrazine sulphate, identified by melting point and mixture melting point.

The 4.6 grams of the crude white reaction product was dissolved in dimethylformamide (13 ml.) and precipitated by addition to 100 ml. of water. The filtered precipitate, washed with alcohol and water and dried, melted at 155°–157° C. with dec. One recrystallization from acetonitrile and absolute alcohol (3:5 mixture) gave material melting at 155.5°–157° C. with dec. (after drying at 80° C. under an atmosphere of less than 1 mm.). The purified reaction product is very soluble in dimethylformamide, soluble in tetrahydrofuran or acetonitrile, and slightly soluble in hot ethyl alcohol. It is insoluble in water, ether, and hydrocarbon solvents.

*Analysis.*—Calcd. for $C_{18}H_{21}N_6O_{10}PS_3$: C, 35.52; H, 3.48; N, 13.81; P, 5.09; S, 15.81; meq. of bromine per gram=19.7. Found: C, 35.68; H, 3.60; N, 13.86; P, 5.11; S, 16.21; meq. of bromine per gram=19.2.

Thermal decomposition of tris(p-hydrazidosulfonylphenyl) phosphate

Pure samples of the reaction product from Example 2 were decomposed in a gas decomposition apparatus using Nujol (mineral oil) and dibutyl phthalate as diluents. The decompositions were carried out at several temperatures and the results, which appear in the following table, are reported in terms of ml. of gas (at S.T.P.) per gram of sulfonylhydrazide. Infrared spectra of gaseous reaction products failed to indicate any absorption; nitrogen evidently is the only volatile product. In addition, qualitative tests failed to indicate the presence of sulphur dioxide or hydrogen sulfide.

The gas yields were calculated based on the decomposition reaction:

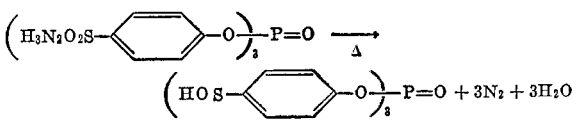

Based on this reaction the theoretical ml. of gas per gram of tris(p-hydrazidosulfonylphenyl) phosphate is 110.5 ml. (based on $N_2$ evolved). In all cases, gas yields based on this decomposition reaction were in excess of 90%.

TABLE I

| Dec. Temp.,° C. | Ml. of gas per g. at S.T.P. | Percent Yield * | Half-life $t_{0.5}$(min.) | Diluent |
|---|---|---|---|---|
| 136 | 105 | 95 | 23 | Dibutyl phthalate. |
| 150 | 108 | 98 | 4 | Do. |
| 159 | 107 | 97 | 2 | Do. |
| 138 | 107 | 97 | 29 | Nujol. |
| 148 | 109 | 99 | 3 | Do. |
| 159 | 109 | 99 | 3 | Do. |

*Theoretical ml. per gram=110.5 (based on $N_2$ evolved).

Example 3.—Preparation of bis(p-chlorosulfonylphenyl) methylphosphonate

Diphenyl methylphosphonate (63.3 grams, 0.26 mole) was reacted with 602 grams (5.16 moles) of chlorosulfonic acid in a manner similar to that described for triphenyl phosphate. Addition of the reaction mixture to ice, extraction with chloroform and concentration of the combined, washed and dried chloroform extracts followed by dilution of the concentrate (250 ml.) with pentane precipitated an oil. The solvent layer was decanted and the oil solidified on trituration with fresh ice cold pentane. The filtered, washed and dried white solid (78.3 grams) melted at 81°–86° C. A second crop of product (13.6 grams), melting point 85°–87.5° C., was obtained upon dilution of the chloroform-pentane filtrate with the non-solvent pentane. The combined fractions of bis(p-chlorosulfonylphenyl) methylphosphonate melted at 83°–86° C.

Recyrstallization of the crude reaction product twice from a 50:50 benzene-ligroine mixture raised the M.P. to 84.5°–87° C.

*Analysis.*—Calcd. for $C_{13}H_{11}Cl_2O_7PS_2$: C, 35.07; H, 2.49; Cl, 15.92; P, 6.95; S, 14.40; mol. wt. 445.24. Found: C, 35.08; H, 2.60; Cl, 15.82; P, 7.02 S, 14.45; mol. wt. 457.0 (determined cryoscopically in benzene).

Example 4.—Preparation of bis(p-hydrazidosulfonylphenyl) methylphosphonate

To bis(p-chlorosulfonylphenyl) methylphosphonate (22.2 grams, 0.05 mole) dissolved in acetonitrile (125 ml.) and maintained at 4±1° C. was added in 1¾ hours with stirring a solution of hydrazine (>95%, 7.42 grams, 0.22 mole) in 20 ml. of acetonitrile. Upon completing the addition, the reaction mixture, consisting of a finely divided white solid and a clear pale yellow solvent layer, was stirred at room temperature for one hour. The reaction mixture was cooled to 3° C. and filtered. The filter-cake, washed with fresh acetonitrile, was dried in vacuo at room temperature to give 7.6 grams of a gummy pale pink solid. This was dissolved in water (35 ml.) to give a weakly basic solution. Neutralization of the aqueous solution followed by cooling failed to yield any solid. Addition of excess concentrated sulfuric acid, however, precipitated 13 grams (0.1 mole) of hydrazine sulfate identified by M.P. and mixture M.P. The strongly acidic aqueous solution was discarded.

The combined acetonitrile filtrate and washings were concentrated to dryness at reduced pressure (pot temperature less 25° C.) and left a somewhat gummy white solid. The solid, washed with ether and dried in vacuo, weighed 22.75 grams and melted at 118°–124° C. with decomposition. A filtered solution of the solid in dimethylformamide (30 ml.) added to water (700 ml.) gave an oil. On cooling and scratching the oil solidified. The resultant filtered white solid was washed consecutively with absolute alcohol and ether. The dried white solid weighed 17.35 grams and melted at 130°–134° C. with decomposition.

A portion of the reaction product was precipitated from its solution in dimethylformamide by addition to water and gave material melting at 132°–134° C. with decomposition after drying in vacuo (<1.0 mm.) at approximately 80° C.

*Analysis.*—Calcd. for $C_{13}H_{17}N_4O_7PS_2$: C, 35.78; H, 3.93; N, 12.84; P, 7.10; S, 14.70; meq. bromine per gram=18.4. Found: C, 35.84; H, 4.27; N, 12.91; P, 7.12; S, 14.84; meq. bromine per gram=19.0.

The following examples illustrate the utility of the phosphorus-containing sulfonyl hydrazides as blowing agents for resinous blends.

Example 5

Free-flowing particles (dry blend) of plasticized thermoplastic vinyl resin were formed by mixing a masterbatch of the following composition in a Henschel Blender at a temperature below about 200° F.

Ingredient: Parts (grams)
Polyvinyl chloride homopolymer having a number ave. mol. wt. of 26,000 and a wt. ave. of 54,000 (determined by gel permeation chromatography) _____ 1,000
Dioctyl phthalate _____ 700
Epoxidized soybean oil _____ 50
Liquid Ca-Zn octoate stabilizer _____ 40
50 mesh limestone _____ 100
$TiO_2$ pigment _____ 20
Calcium silicate _____ 7.5

These particles were used to make vinyl sheets in accordance with each of the following examples. In such example the dry blend was laid up to 120 mil thickness on a rubber bonded-asbestos fiber felt 0.039 inch thick. The dry blend compositions were then placed between two heated platens and held for given periods after which the fused sheets that formed were cooled and stripped from the felt and examined. When a blowing agent was added to the masterbatch, it was intimately mixed therewith by mixing in a Henschel Blender for about 15 minutes at room temperature.

Examples 6, 7, 8, 9 and 10

TABLE II

| | Masterbach (grams) | Blowing agent (grams) | Temp. upper platen (° F.) | Temp. lower platen (° F.) | Time held |
|---|---|---|---|---|---|
| Ex. 6 | 300 | 0 | 1,020 | 420 | 1 min. |
| Ex. 7 | 296.5 | [1] 3.5 | 1,020 | 420 | 1 min. 15 sec. |
| Ex. 8 | 296.5 | [2] 3.5 | 1,012 | 420 | 1 min. 15 sec. |
| Ex. 9 | 295 | [2] 5 | 1,022 | 420 | 1 min. 5 sec. |
| Ex. 10 | 296 | [3] 4 | 1,015 | 420 | 1 min. |

[1] 4,4′-oxybis(benzenesulfonylhydrazide).
[2] Tris(p-hydrazidosulfonylphenyl) phosphate.
[3] Bis(p-hyrazidosulfonylphenyl) methylphosphonate.

The sheet formed in accordance with Example 6 was well fused throughout and flexible. It had a density of about 72.8 pounds per cubic foot. The sheet formed in accordance with Example 7, using a commercial blowing agent, was a flexible fine celled foam having a density of about 35.9 pounds per cubic foot. Both sheets formed in accordance with Examples 8 and 9 were flexible fine celled foams having densities of 38.7 and 30.1 pounds per cubic foot, respectively, although the sheet of Example 9 had a slightly coarser cell structure. The sheet of Example 10 was a flexible fine celled foam having a density of 38.1 pounds per cubic foot.

The preferred percentage range for blowing agent is between about 1.0% to 5.0% by weight, based on the organic resin component.

We claim:
1. A compound of the formula:

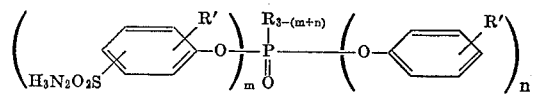

wherein
R is lower alkyl,
R′ is a member selected from the group consisting of chlorine, $NO_2$, lower alkyl, and H,
m is an integer from 1 to 3,
n is an integer from 0 to 2, and
m+n is an integer from 1 to 3.

2. The compound of the formula:

3. The compound of the formula:

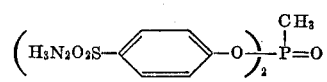

References Cited
UNITED STATES PATENTS
3,017,321 1/1962 Hardy _____ 167—30

CHARLES B. PARKER, *Primary Examiner.*
R. L. RAYMOND, *Assistant Examiner.*

U.S. Cl. X.R.
260—947, 30.6